May 27, 1958 S. S. BROWN 2,836,066
VOLUME COMPENSATOR FOR MEASURING TANKS
Filed Dec. 17, 1956
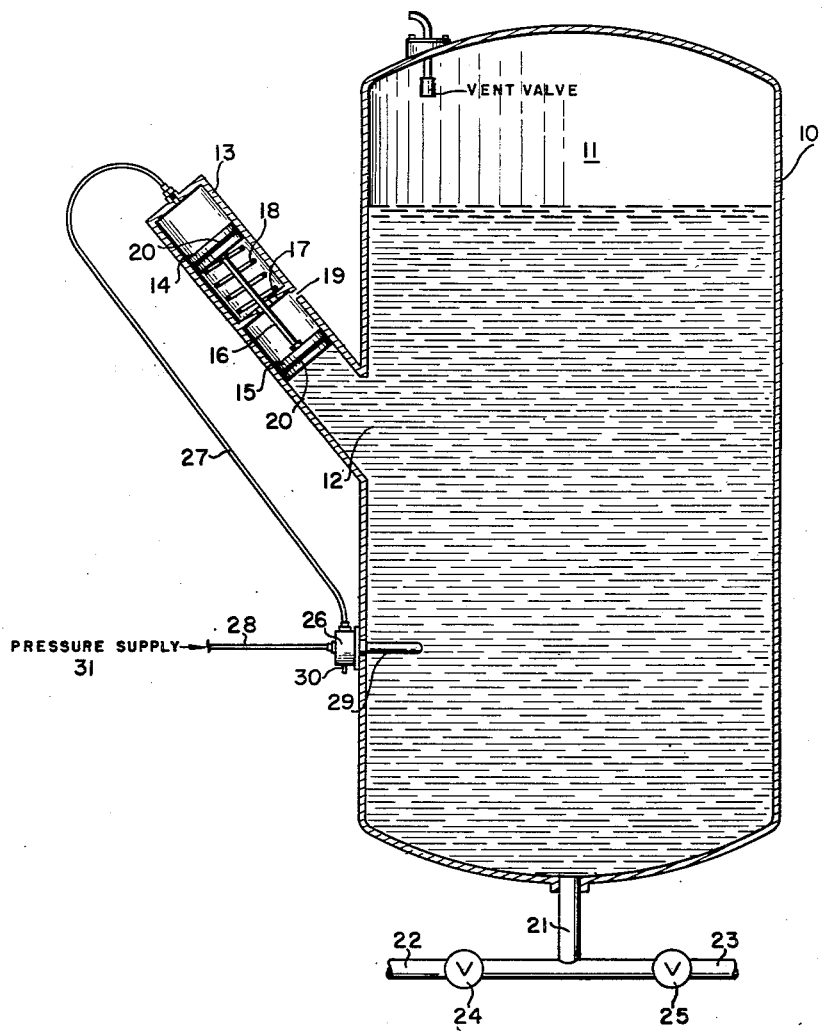
INVENTOR.
STEPHEN S. BROWN,
BY John S. Schneider
ATTORNEY.

United States Patent Office 2,836,066
Patented May 27, 1958

2,836,066

VOLUME COMPENSATOR FOR MEASURING TANKS

Stephen S. Brown, La Porte, Tex., assignor, by mesne assignments, to Esso Research and Engineering Company, Elizabeth, N. J., a corporation of Delaware Application December 17, 1956, Serial No. 628,587

3 Claims. (Cl. 73—223)

This invention concerns a temperature compensator. More particularly this invention concerns a temperature compensator adaptable for use with a volume type displacement meter.

An object of this invention is to provide a device which accurately varies the volume of a liquid meter in response to temperature changes within the metering vessel.

Briefly, this invention comprises a device responsive to temperature changes for varying the volume of a liquid metering tank comprising a cylindrical member connected to a sidewall of the tank and fluidly communicating with the interior thereof; first and second spaced apart pistons slidably arranged in said cylinder and a piston rod interconnecting the first and second pistons; biasing means supportingly arranged between the first and second pistons adapted to urge the pistons in one direction; means adapted to supply fluid pressure to one side of the pistons to force the pistons against the urging of the biasing means and means positioned in the tank responsive to temperature variations of liquid contained in the tank adapted to control the fluid pressure supply means.

The term "liquid" as used herein means substantially a liquid phase that may or may not contain disssolved or entrained gases.

For a more complete description of the elements of my invention, reference is now made to the drawing wherein, the single figure is a sectional elevation of the temperature compensating apparatus connected to the volume chamber of a displacement meter.

In the figure a meter vessel 10 is provided with an opening 12 on which is arranged a piston cylinder 13. The piston cylinder has arranged therein spaced apart piston members 14 and 15 interconnected by means of a rod 16. A volume chamber 11 is thereby formed by vessel 10 and the portion of cylinder 13 between piston 15 and the interior of vessel 10. The cylinder 13 also is provided with a spider or other suitable support 17 upon which is positioned a spring 18 which extends between the piston 14 and the support 17 in order to bias the piston members 14 and 15 in a direction which tends to increase the volume of chamber 11. Piston members 14 and 15 are provided with suitable sealing means designated at 20, in order to prevent fluid from entering the space between the piston members. A bleed port 19 is formed in cylinder 13 in order to exhaust fluid contained in the space which may have leaked through the sealing surfaces.

Although any desired inlet and outlet connections may be employed, as shown, the meter vessel 10 is provided with a common liquid inlet and outlet conduit 21 to which is connected an inlet conduit 22 and an outlet or discharge conduit 23. Inlet conduit is provided with a valve 24 and, similarly, outlet conduit 23 is provided wtih a discharge valve 25.

The temperature control may be any desired type wherein varying pressure signals are transmitted to cylinder 13 in response to changes of temperature within chamber 11. Accordingly, a suitable device includes a control element, such as a valve means 26, and a temperature sensitive bulb 29. A constant fluid pressure is transmitted through conduit 28 from the fluid pressure supply 31. Expansion and contraction of fluid in bulb 29 caused by higher and lower temperatures, respectively, in chamber 11 causes valve means 26 to transmit less or more, respectively, of the fluid pressure from the supply through conduit 28 to conduit 27. Fluid pressure from the supply not transmitted to conduit 27 exhausts through a conduit 30. The details of the valve means have not been illustrated since such apparatus and the operation thereof should be apparent to those skilled in the art. For example, a bellows or piston may be employed for actuating a valve element in valve means 26 for permitting less or more of the supply fluid pressure to enter conduit 27 in response to expansion or contraction, respectively, of the bulb fluid.

In operation, fluid pressure supply 31 transmits a constant fluid pressure to valve means 26 through conduit 28. When a lower temperature than a selected standard temperature is in chamber 11, the fluid in bulb 29 actuates valve means 26 to cause a greater fluid pressure transmission to conduit 27 and a lesser fluid pressure exhaust through conduit 30. The increase of fluid pressure in conduit 27 increases the fluid pressure on piston 14 in cylinder 13 thereby causing piston 14 to move against the bias of spring 18. Movement of piston 14 moves piston 14, through connecting rod 16, thereby decreasing the volume of chamber 11 to compensate for the decreased volume of liquid caused by the lower temperature.

Likewise when a higher temperature than a standard temperature is in chamber 11, the fluid in bulb 29 actuates valve means 26 to cause a lesser fluid pressure transmission to conduit 27 and a greater fluid pressure exhaust through conduit 30. The decrease of fluid pressure in conduit 27 decreases the fluid pressure on piston 14 thereby causing piston 14 to be moved by the bias of spring 18. Piston 15 moves in the same direction as piston 14 thereby increasing the volume chamber 11 to compensate for the increased volume of liquid caused by the higher temperature.

Thus the device provides a means for correcting the volume of oil delivered by a volume type displacement meter to a standard temperature condition of, for example, 60° F. The area of the piston is arranged so that the volume displaced for each increment of travel is proportional to the volume correction necessary to correct the total volume of oil to standard temperature of 60° F. For example, if the capacity per dump of the volume meter is one barrel, or 9,702 cubic inches, the piston 15 may sweep 97.02 cubic inches of volume per 20° F. temperature change in order to compensate for a 20 degree change in temperature.

Having fully described the operation, objects and elements of my invention, I claim:

1. A device for varying the volume of a liquid metering vessel to compensate for liquid temperature variations comprising a tank having a cylindrical member connected thereto and fluidly communicating therewith, spaced apart pistons slidably arranged in said cylinder, a piston rod interconnecting said pistons, biasing means supportingly arranged between said pistons adapted to urge said pistons in one direction and means responsive to temperature change in said vessel adapted to supply fluid pressure to one of said pistons, the force of said pressure acting against the urging of said biasing means.

2. A device as recited in claim 1 wherein said cylinder extends upwardly from said tank.

3. A device for varying the volume of a liquid metering vessel to compensate for liquid temperature variations comprising a tank having a hollow member connected thereto and fluidly communicating therewith, spaced-apart pistons slidably arranged in said hollow member, a piston rod interconnecting said pistons, biasing means arranged in said hollow member adapted to urge said pistons in one direction and means responsive to temperature change in said vessel adapted to supply fluid pressure to said hollow member to move said pistons against the urging of said biasing means.

References Cited in the file of this patent

UNITED STATES PATENTS

| | | |
|---|---|---|
| 709,638 | Johnson | Sept. 23, 1902 |
| 1,488,122 | Juergens | Mar. 25, 1924 |
| 1,643,469 | Reeves | Sept. 27, 1927 |
| 2,025,670 | Pettee | Dec. 24, 1935 |
| 2,257,590 | Brouse | Sept. 30, 1941 |